Patented June 5, 1945

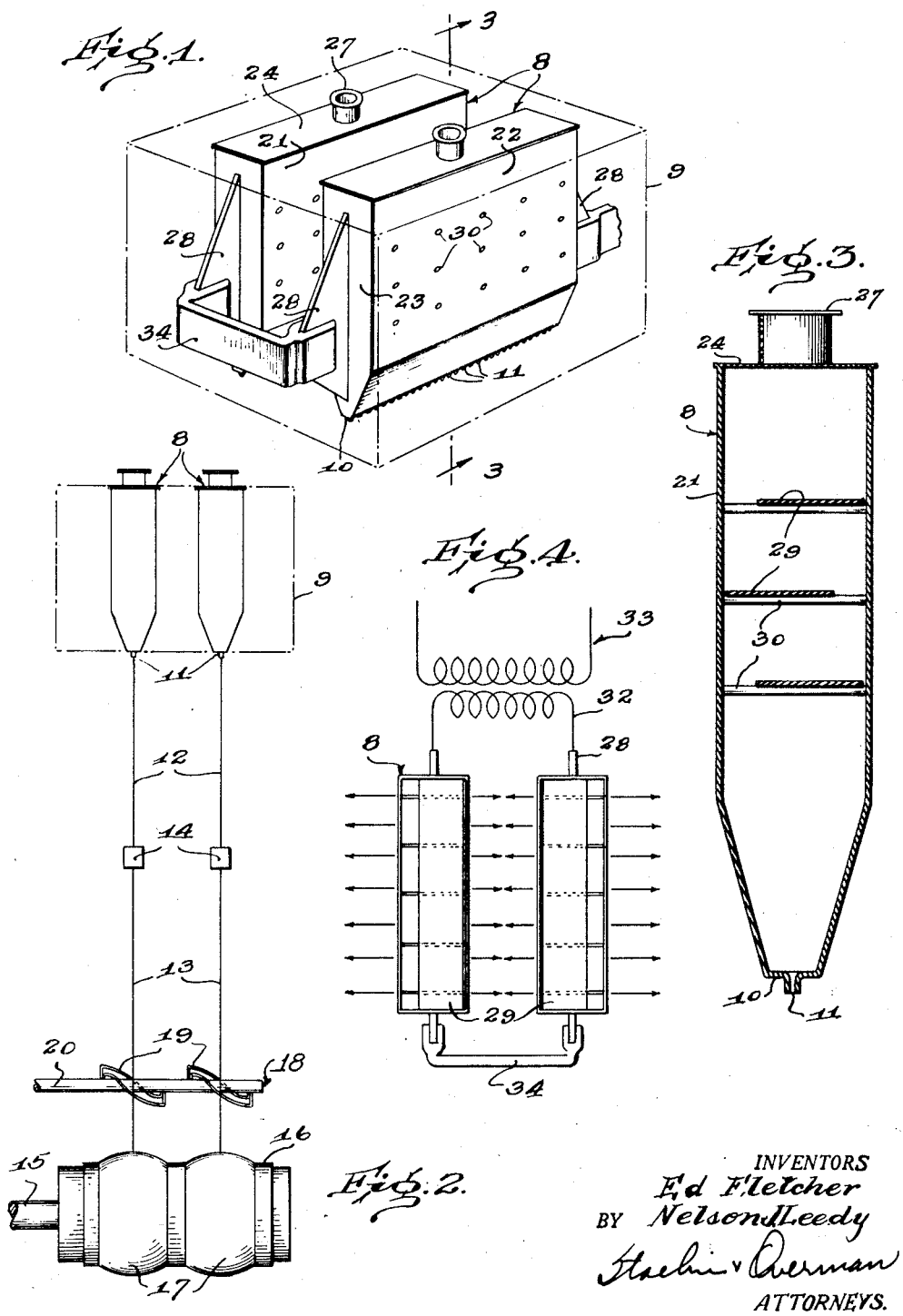

2,377,772

UNITED STATES PATENT OFFICE 2,377,772

APPARATUS FOR THE PRODUCTION OF GLASS FIBERS

Ed Fletcher and Nelson J. Leedy, Newark, Ohio, assignors to Owens-Corning Fiberglas Corporation, Toledo, Ohio, a corporation of Delaware Application July 21, 1943, Serial No. 495,796

5 Claims. (Cl. 13—6)

The present invention relates to apparatus for converting molten glass or like heat-softenable material to fine fibers, and, more particularly, to improved means for feeding molten glass continuously in a plurality of small streams to be attenuated into fibers or filaments by an attenuating means.

In the mechanical drawing of glass fibers it has heretofore been customary to employ an apparatus which comprises in general, a glass melting unit usually in the form of an electrically heated metal container or bushing which is mounted in refractory blocks and which provides the supply body of molten glass from which the filaments are drawn. Glass material such as cullet in the form of prefabricated marbles, or glass batch either loose or in the form of briquettes, is fed to the bushing to be melted, the rate of feed being sufficient to maintain the glass therein at a constant level during the production of fibers. The glass flows from the bushing in a plurality of small streams which are attenuated into fibers by a rotatable drum or spool on which a strand of the fibers is wound. There is a guide disposed between the bushing and the spool for gathering the filaments into a strand, and a traversing mechanism located substantially in the path of the strand between the spool and guide for traversing the strand lengthwise of the spool to form a suitable package thereon. One such apparatus is illustrated in the patent to Slayter and Thomas No. 2,234,986 dated March 18, 1941, and it is with this type of operation that the present invention finds greatest utility. Certain aspects of the invention, however, may be utilized with advantage wherever glass is converted into fibers by apparatus including a metal bushing or feeder for flowing a multiplicity of small streams of molten glass, for instance, in the production of staple-type glass fibers by attenuation of small streams by means of a blast of gas directed in the direction of flow of the streams as shown in the Slayter and Thomas Patent No. 2,133,236.

To promote and insure a constant flow of glass for the continuous attenuation of fibers, the temperature is maintained at a level well above the softening point of the glass. It is generally customary to employ a type of glass having a relatively high melting point and which has the inherent characteristics for producing fibers having a high tensile strength and other necessary qualities. The current supplied to the bushing for maintaining the high temperature required to melt and hold the glass in a molten state must be constant to a very high degree.

This is extremely important in the production of continuous filaments. The temperature of the glass must be regulably controlled to provide an even temperature at the stream outlets since the viscosity of the glass together with the speed at which it is attenuated determines to a great extent the final size of the fiber. Thus it will be seen that the raising or lowering of the viscosity only slightly will produce a variation in the diameter of the fibers attenuated. Normally the diameter of the fiber may be only a few microns but when gathered with others of like nature into a strand the variation is magnified hundreds of times, thus producing a non-uniform product.

Electrical heating of the bushing was usually accomplished by connecting the bushing in a circuit so that current flowing from end to end through the bushing walls and to lesser extent through the molten glass in the bushing heats the glass to the required high temperature. Due to the high temperature required and the high conductance of the metal walls of the bushing, which are of platinum or platinum alloy, the current through the bushing is very high, amounting to hundreds of amperes. This necessitates heavy leads and connections and a large transformer, one end of the secondary coil of which is attached directly to one end of the bushing; the other end of the secondary being connected by a large bus bar to the other end of the bushing.

This bus bar of necessity extends along one side of the bushing and hence, in addition to being a factor in power loss, creates a magnetic field that influences the path of current flow in the bushing walls to an extent interfering with the desired uniformity of heating and subjecting the bushing to strains that shorten its life.

It is the object of the present invention to provide glass fiber forming apparatus free of these disadvantages and difficulties.

A further object of the invention is to electrically connect a pair of glass melting bushings in a manner to substantially avoid the field losses and effects of long bus bars and leads heretofore used for the installation of bushing units.

Bushings of the kind ordinarily used in the production of continuous glass fibers have a capacity of 3 to 5 pounds of glass and by calculation require several kilowatts of electrical power to melt this much glass and raise the temperature thereof to the desired attenuating temperature. However, in actual practice the power consumption is several times the theoretical requisite, illustrating the large loss accounted for by radiation. Nor has it been fully feasible heretofore to decrease radiation substantially through the use of thermal insulation about the bushing since the amount of insulation required to substantially reduce radiation losses detracts seriously from the required accessibility of the bushing to the operator.

Another object of the invention is to substantially decrease radiation losses from the bushing. This is achieved by positioning a pair of high temperature glass melting bushings in a manner whereby the reciprocal radiation from the adjacent heated walls tends to reduce the amount of current necessary to maintain each bushing at the required working temperature.

A still further object of the invention is to provide means for equally distributing heat from a common source of electric power to a pair of glass melting units whereby the viscosity of the glass in each unit is maintained substantially constant and equal.

Another object of the invention is to provide a single attenuating means for attenuating and winding into separate packages strands formed from the separate fiber forming units of the pair.

Other objects and advantages of the invention will be in part apparent and in part pointed out during the course of the following description and in the accompanying drawing, in which:

Figure 1 is a perspective view of a pair of glass melting bushings arranged in accordance with the present invention;

Figure 2 is a view illustrating diagrammatically the principles of the invention;

Figure 3 is a vertical sectional view through one of the bushings, taken substantially on the line 3—3 of Figure 1; and Figure 4 is a plan view of the bushings.

Referring to the drawing and Figures 1 and 2 in particular, the invention comprises generally a pair of metal bushings 8 adapted to receive glass batch or cullet and reduce it to a molten state. The bushings are mounted in spaced side by side relation within a refractory block indicated by broken lines at 9 which may be suitably supported to provide an unrestricted area therebeneath. The bottom wall 10 of each bushing is provided with a row of orifices 11 (Figure 3) through which the molten glass flows in the form of thin streams 12.

The streams are attenuated by suitable winding means which includes in part a rotatable spindle 15 adapted to removably support a tube 16 or spool on which the strand 13 is wound into a package 17. The relatively high winding speed of the spindle and tube cause the streams to be attenuated to extremely fine filaments. The filaments are gathered together into a strand 13 by means of guides 14 disposed vertically beneath the orifices, between the bushing and the attenuating means.

The positioning of a pair of bushings in side by side relation produces parallel rows of fibers which are gathered into separate strands by the guides 14 and wound separately into packages on the tube as shown in Figure 2. The two packages may be unwound individually or together for or during subsequent operations.

Traversing mechanism 18 is provided to guide the strand during the winding in order that the packages may be wound in a manner to facilitate ready removal of the strand for twisting or plying. The mechanism comprises pairs of wires 19 bent into spiral conical form and arranged on a rotatable shaft 20 which is disposed parallel to a plane passing through the strands and at a right angle to the axis thereof. The traversing mechanism is arranged substantially in the path of the strands to engage each strand and traverse it once in each direction for each rotation of the traverse shaft.

The bushings 8 are formed of sheet metal having high temperature resistant qualities such as, for instance, a platinum-rhodium alloy, the melting point of which is substantially higher than that of glass. Each bushing comprises inner and outer side walls 21 and 22, respectively, and end walls 23. The side walls taper inwardly along their lower edge to meet the narrow bottom wall 10 thus providing a substantial volume of glass over the orifices and also permitting a more accurate control of heat.

A cover 24 secured to the side and end walls is provided with an opening 27 through which the batch or cullet is fed and serves to prevent refractory grit and other impurities from entering the bushing and contaminating the molten glass.

An electrical lead 28 or connector is formed on each of the end walls 23 and extends substantially the full length thereof so that the flow of current will be more evenly distributed over the entire surface. Longitudinal heater strips 29 or plates (Figure 3) may be disposed in a horizontal plane within the bushing and are supported intermedially of their length on transverse pins 30 riveted to the walls 21 and 22. The strips are welded at their ends to the end walls 23 and are arranged alternately along opposite sides of the bushing to cause the glass to flow in a direction crosswise of the bushing to disrupt the normal currents of convection present in a body of molten glass.

Referring to Figure 4, the bushings 8 are shown electrically connected in series with the secondary coil 32 of a power transformer 33 through the leads 28 at one end of each of the bushings and by means of a bus bar 34 interconnecting the other ends of the bushings. In this manner each bushing serves as a return lead for the other. It will be noted that the length of the leads is reduced to a minimum thereby limiting the field losses of exposed leads to the lowest possible degree.

The closely-adjacent, side by side relation of the bushings also greatly decreases radiation losses from the bushings. Because of the proximity of the adjacent walls only a very small part of the heat radiated from the two adjacent walls of the bushings is lost. As a result, to all practical effects, the radiation loss from the two bushings is equivalent to the loss from a single bushing plus only the loss from the ends of the second bushing.

The spacing between the bushings may be varied to some extent to satisfy requirements presented by the supporting means, the guides, and the attenuating means. The minimum space between the bushings is desired in the interest of efficiency of heating and electrical connections and is limited only by the need to prevent arcing between the adjacent walls. In general, the benefits of the invention are obtained to important degree if the space between adjacent sides of the bushings is equivalent to about one-fourth to one and one-half times the width of the bushings.

The positioning of a pair of bushings in this manner has resulted in a considerable saving of electrical power over the use of two separate bushing installations. We have found that in almost doubling the bushing output, adequate temperatures may be accurately maintained in the two bushings with an increase in power of only between 30 to 50% of the power consumed by a single bushing, thereby materially reducing the cost of the fiber forming operation.

The use of a pair of bushings in the manner just described also makes possible the formation of separate packages of continuous strands in one operation and thus eliminates the use of individual winding mechanisms. This combination of twin sources of supply and a single attenuating means amounts to a further substantial reduction in the cost of operation as well as providing separate packages which may be processed together or individually.

Modifications may be made within the spirit and scope of the appended claims.

We claim:

1. Apparatus for producing continuous fine glass fibers simultaneously from separate sources comprising a pair of metal-walled glass melting bushings disposed in side by side relation and having openings therein for discharging fine streams of molten glass, said bushings being sufficiently closely spaced to cause substantial heat radiation between the adjacent walls thereof, electrical connections connecting said bushings in series, and means for electrically heating said bushings from a single source of current to maintain the glass in a fluid state, said side by side relation and series connection effecting a uniform heating of each bushing with respect to the other.

2. Apparatus for producing continuous fine glass fibers simultaneously from separate sources comprising a pair of parallelly arranged metal-walled glass melting bushings disposed in side by side relation and having openings therein for discharging fine streams of molten glass, an electrical connection connecting said bushings in series, and means for electrically heating said bushings from a single source of current to maintain the glass in each bushing at an equal degree of viscosity with respect to the other bushing.

3. An apparatus for forming fine glass fibers comprising a pair of metal-walled glass melting bushings disposed in parallel side by side relation and having discharge orifices therein, an electrical connection at one end of the bushings interconnecting said bushings in series, and a single source of electric power connected across the other ends of said bushings, each bushing forming a return lead for the other and the series connected relation of said bushings adapted to maintain a constant and equal degree of heat in each bushing with respect to the other bushing.

4. In an apparatus for forming fine glass fibers including fiber attenuating and winding means, comprising a pair of closely spaced metal-walled glass melting bushings in side by side relation and each having orifices for discharging fine streams of molten glass, a bus bar interconnecting one end of the bushings in series, and a single source of electric power connected across the other ends of said bushings, each bushing forming a return lead for the other and disposed within the electrical field thereof.

5. In an apparatus for forming a uniform pair of packages of glass fibers in strand form on a single support including fiber attenuating and winding means, a pair of metallic glass melting bushings, said bushings arranged in parallel side by side relation and each provided with orifices for discharging fine streams of molten glass, a bus bar interconnecting one end of the bushings, and a source of electric power connected in series with said bushings, each bushing forming a return lead for the other and thereby maintaining the glass in both bushings at the same temperature and viscosity.

ED FLETCHER.
NELSON J. LEEDY.